US008724834B2

(12) United States Patent
Huseth et al.

(10) Patent No.: US 8,724,834 B2
(45) Date of Patent: May 13, 2014

(54) ACOUSTIC USER INTERFACE SYSTEM AND METHOD FOR PROVIDING SPATIAL LOCATION DATA

(75) Inventors: Steve Huseth, Plymouth, MN (US); Tom Plocher, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 1002 days.

(21) Appl. No.: 12/652,823

(22) Filed: Jan. 6, 2010

(65) Prior Publication Data

US 2011/0164768 A1 Jul. 7, 2011

(51) Int. Cl.
*H04R 5/02* (2006.01)
*H04R 5/00* (2006.01)
*H04B 3/00* (2006.01)

(52) U.S. Cl.
USPC ................................ 381/310; 381/17; 381/77

(58) Field of Classification Search
CPC .............. H04R 5/02; H04R 5/00; H04S 3/00; H04S 3/02; H04S 7/40; H04S 2400/11; H04B 3/00
USPC ........................ 381/300, 310, 309, 77, 17, 18
See application file for complete search history.

(56) References Cited

U.S. PATENT DOCUMENTS

| | | | | |
|---|---|---|---|---|
| 5,862,229 | A | 1/1999 | Shimizu | 381/17 |
| 5,920,477 | A | 7/1999 | Hoffberg et al. | 364/148 |
| 6,075,868 | A | 6/2000 | Goldfarb et al. | 381/301 |
| 7,218,240 | B2 * | 5/2007 | Tillotson | 340/692 |
| 7,420,510 | B2 | 9/2008 | Kolavennu et al. | 342/465 |
| 2003/0083811 | A1 | 5/2003 | Demir et al. | 701/208 |
| 2006/0232259 | A1 | 10/2006 | Olsson et al. | 324/67 |
| 2007/0241965 | A1 | 10/2007 | Kolavennu et al. | 342/465 |
| 2009/0143982 | A1 | 6/2009 | Katzer et al. | 701/213 |
| 2009/0217188 | A1 | 8/2009 | Alexander et al. | 715/771 |
| 2009/0241753 | A1 | 10/2009 | Mann | 84/384 |

* cited by examiner

*Primary Examiner* — Vivian Chin
*Assistant Examiner* — Douglas Suthers
(74) *Attorney, Agent, or Firm* — Kermit D. Lopez; Luis M. Ortiz; Ortiz & Lopez, PLLC

(57) ABSTRACT

An acoustic user interface system and method for tracking spatial location data. A location tracking unit provides location information with respect to an object in an environment. The location information may be further employed to synthesize a perception of three-dimensional spatial location data with respect to multiple objects in the environment. The acoustic user interface communicates the three-dimensional spatial location data via an auditory channel to a stereophonic device based on a human stereophonic perception of one or more acoustic signal variable correlated with a relative location of the objects in order to co-ordinate and communicate location information effectively.

19 Claims, 4 Drawing Sheets

ACOUSTIC USER INTERFACE SYSTEM AND METHOD FOR PROVIDING SPATIAL LOCATION DATA

TECHNICAL FIELD

Embodiments are generally related to location tracking systems and methods. Embodiments also relate in general to the field of computers and similar technologies, and in particular to software utilized in this field. In addition, embodiments relate to acoustic user interface system and techniques for providing spatial location data.

BACKGROUND OF THE INVENTION

In some situations, it may be desirable to track and provide spatial location information within a complex dynamic environment such as, for example, battle field operations, emergency management, process plant control, firefighting applications and so forth. Location and tracking systems, such as GPS (Global Positioning System) based automotive systems and other advanced tracking systems can be employed to track personnel and provide location data and tracking information via a user interface (e.g. display screen). Such tracking systems determine specific geographical information with respect to the current location; store the geographical information, mark the current location and display location information via the user interface. A user may further determine his or her path based on actual circumstances in reference to the user interface and mark the path to a destination for guidance to the destination.

Most prior art location and tracking systems are configured with an interactive map displayed via the user interface to present current location context and data indicative of the path to next waypoint. The user interface associated with such prior art tracking systems may be, for example, a relatively expensive graphical display that mounted on a vehicle or integrated with a handheld device carried by the user.

The user interface in association with such graphical displays may not be compatible for use by a mobile worker and therefore head mounted displays have been adapted in a number of tracking systems for critical hands free operations. Such head-mounted displays are typically excessively costly and cumbersome to use. Additionally, the orientation of the display with respect to the user in such head-mounted displays may be critical to the successful operation and use of the device Based on the foregoing, it is believed that a need exists for an acoustic user interface system and method for providing spatial location data, as described in greater detail herein and for use in location tracking systems.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved location tracking system and method.

It is another aspect of the disclosed embodiments to provide for an improved acoustic user interface system and method for providing spatial location data.

It is a further aspect of the disclosed embodiments to provide for an improved method for tracking spatial location data based on a human stereophonic perception of an acoustic signal.

The aforementioned aspects and other objectives and advantages can now be achieved as described herein. An acoustic user interface system and method for tracking spatial location data is disclosed. A location data tracking unit provides location information (e.g., position, heading, distance, and an optimal path route, etc) with respect to an object in an environment. The location information may be further employed to synthesize the perception of three-dimensional spatial location data with respect to multiple objects in the environment. The acoustic user interface can communicate the three-dimensional spatial location data via an auditory channel based on the difference in arrival of an acoustic signal at each ear with respect to a stereophonic device. Human stereophonic perception of at least one acoustic signal variable may be employed to create an impression of sound arriving from any direction in order to effectively coordinate and communicate location information.

The stereophonic device may include, for example, speakers associated with a helmet, earphones, virtual reality devices and so forth. The acoustic signal variables may be, for example, frequency, time delay from a reference time, tone pulse duration, and the apparent direction of origin. The variation in time delay and the frequency of the sound effect from the speakers associated with the stereophonic device may create the perception of sound arriving from a specific direction. A turning angle and a relative distance of the head with respect to the object may permit a user to focus in the direction of the sound. Heading information can be provided via a compass heading and/or a gyroscope heading mounted with respect to the stereophonic device. The object direction can be provided by map information. Acoustic signal variables such as, for example, pitch, sound color, a rising and falling pitch and/or cadence can indicate other location information such as exit doors/windows, hallways, stairways, dangerous structures and so forth. Such an acoustic signal variable can also be employed to create a unique "audio ID" for each individual in a group being tracked, so each person's identification as well as location information can be identified and communicated. Such an acoustic user interface with three-dimensional spatial location data for direction guidance and spatial awareness is hands-free and directs lesser cognitive workload demands on the user.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
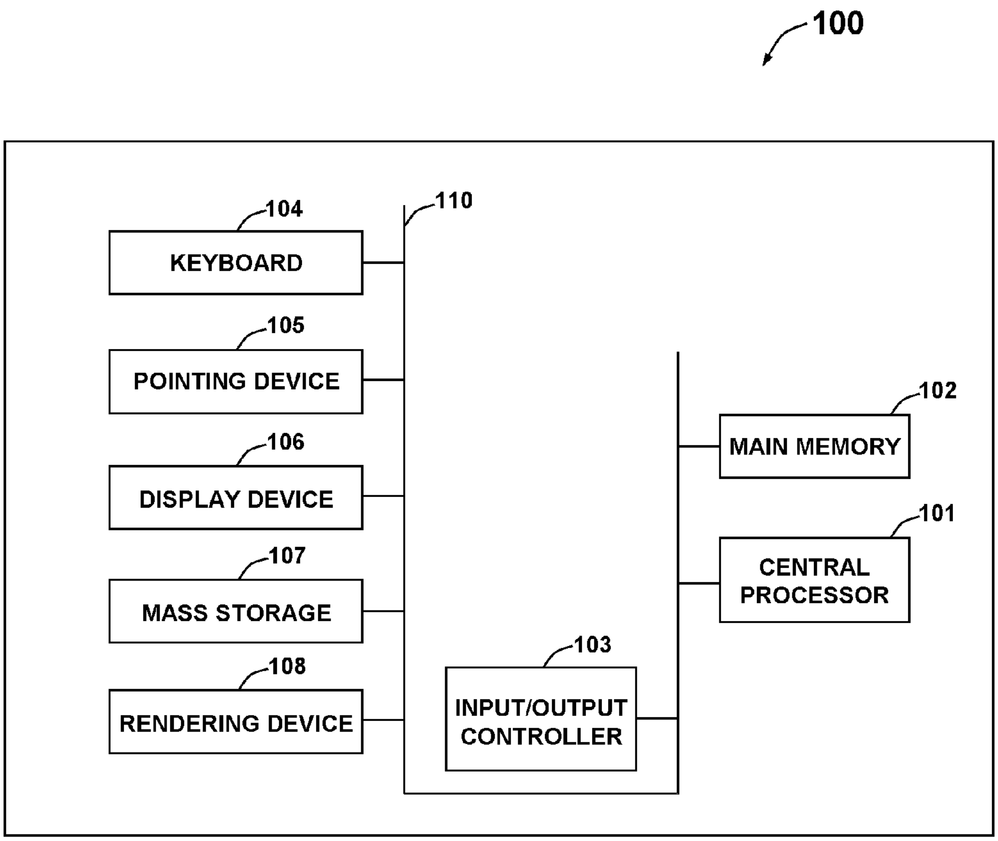
FIG. 1 illustrates a schematic view of a data-processing system in which an embodiment may be implemented.
Figure 2:
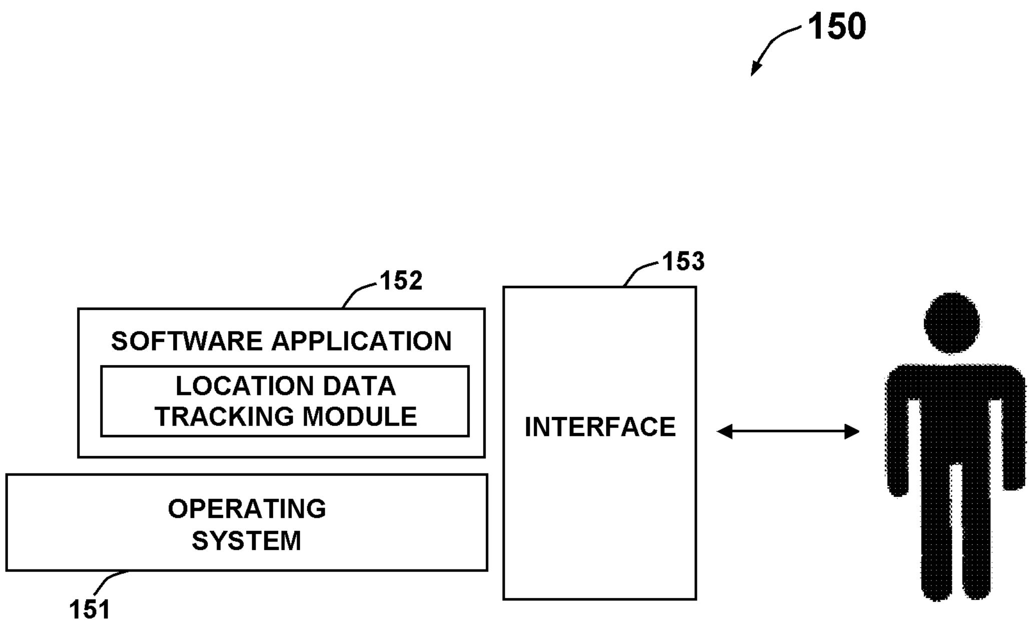
FIG. 2 illustrates a schematic view of a software system including an operating system, application software, and a user interface for carrying out an embodiment.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 comprising, for example, a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108, for example, may be associated with the data-processing system 100 as desired. As illustrated, the various components of the data-processing system 100 communicate through a system bus 110 or similar architecture. It can be appreciated that the data-processing system 100 may be in some embodiments, a mobile computing device such as a Smartphone, a laptop computer, and iPhone, etc. In other embodiments, data-processing system 100 may function as a desktop computer, server, and the like, depending upon design considerations.

FIG. 2 illustrates a computer software system 150 for directing the operation of the data-processing system 100 depicted in FIG. 1. Software application 152, stored in main memory 102 and on mass storage 107, includes a kernel or operating system 151 and a shell or interface 153. One or more application programs, such as software application 152, may be "loaded" (i,e., transferred from mass storage 107 into the main memory 102) for execution by the data-processing system 100. The data-processing system 100 receives user commands and data through user interface 153; these inputs may then be acted upon by the data-processing system 100 in accordance with instructions from operating module 151 and/or application module 152.

The following discussion is intended to provide a brief, general description of suitable computing environments in which the system and method may be implemented. Although not required, the disclosed embodiments will be described in the general context of computer-executable instructions, such as program modules, being executed by a single computer.

Generally, program modules include routines, programs, objects, components, data structures, etc., that perform particular tasks or implement particular abstract data types. Moreover, those skilled in the art will appreciate that the disclosed method and system may be practiced with other computer system configurations, such as, for example, handheld devices, multi-processor systems, microprocessor-based or programmable consumer electronics, networked PCs, minicomputers, mainframe computers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program design to assist in the performance of a specific task, such as word processing, accounting, inventory management, etc.

The interface 153, which is preferably a graphical user interface (GUI), also serves to display results, whereupon the user may supply additional inputs or terminate the session. In an embodiment, operating system 151 and interface 153 can be implemented in the context of a "windowing" system or computer environment. It can be appreciated, of course, that other types of systems are potential. For example, rather than a traditional "windowing" system, other operating systems, such as, for example, Linux may also be employed with respect to operating system 151 and interface 153. The software application 152 can include a spatial location data tracking module that can be adapted for providing location information with respect to an object in an environment. Software application module 152, on the other hand, can include instructions, such as the various operations described herein with respect to the various components and modules described herein, such as, for example, the method 400 depicted in FIG. 4.

Note that the disclosed embodiments may be embodied in the context of a data-processing system 100 depicted in FIG. 1. It can be appreciated, however, that the disclosed embodiments are not limited to any particular application or any particular environment. Instead, those skilled in the art will find that the disclosed embodiments may be advantageously applied to a variety of systems and software applications. Moreover, the disclosed embodiments may be embodied in a variety of different platforms, including but not limited to, for example, Macintosh, UNIX, LINUX, and the like. Therefore, the description of the exemplary embodiments, which follows, is for purposes of illustration and is not considered a limitation.

Figure 3:
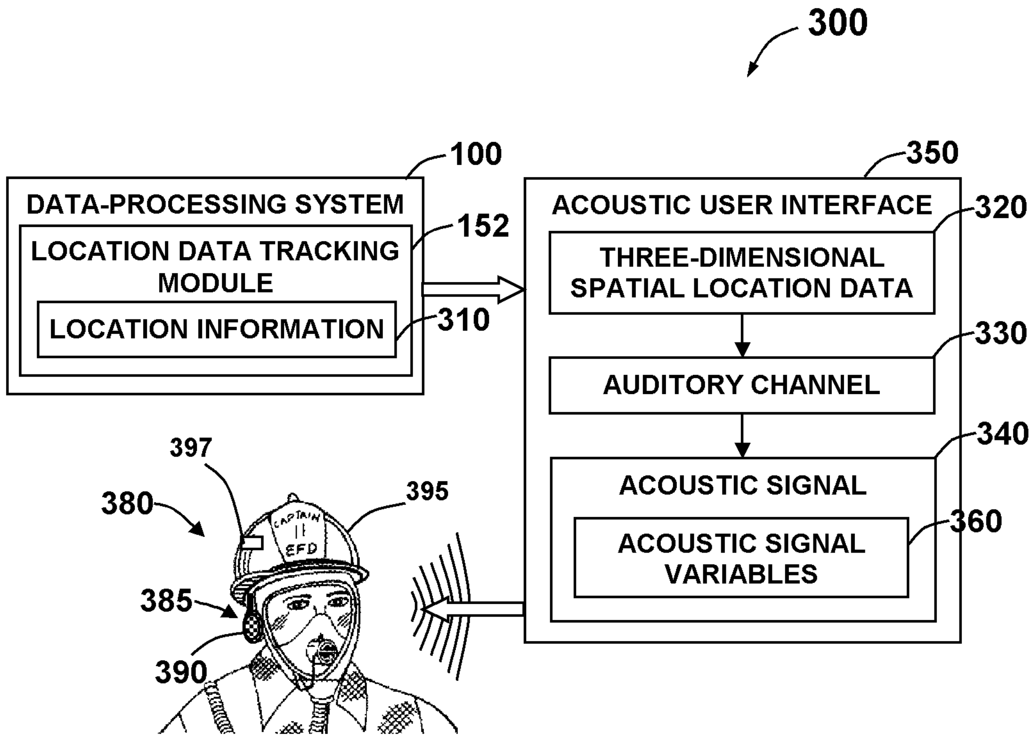
FIG. 3 illustrates a block diagram an acoustic user interface system associated with a location tracking unit for tracking spatial location data, in accordance with the disclosed embodiments.

FIG. 3 illustrates a block diagram an acoustic user interface system 300 associated with a location data tracking module 152 for tracking spatial location data, in accordance with the disclosed embodiments. The acoustic user interface system 300 associated with the location data tracking module 152 may be utilized in various dynamic environments such as, for example, fire fighter and military applications for providing spatial location data. Note that both FIGS. 2-3 illustrate a location data tracking module. That is, the software application 152 shown in FIG. 2 can include a location data tracking module (e.g. a software module), whereas in FIG. 3 the software application 152 is depicted as the location data tracking module 152. The embodiment shown in FIG. 3 is thus slightly different from the embodiment depicted in FIG. 2 but refer equally to software application 152 or location data tracking module 152.

The acoustic user interface 350 communicates three-dimensional direction and distance with respect to an object of interest, and possibly direction and distance to co-workers in the environment. The system 300 may be specially constructed for performing various processes and operations according to the disclosed embodiments or may include a general-purpose computer selectively activated or reconfigured by a code to provide the necessary functionality. The processes disclosed herein are not inherently related to any particular computer, network, architecture, environment, or other apparatus, and may be implemented by a suitable combination of hardware, software, and/or firmware.

The system 300 generally includes an acoustic user interface 350, the location data tracking module 152 and a stereophonic device 385. The location data tracking module 152 provides location information 310 with respect to a user 380 in an environment. Note that location data tracking module 152 as utilized herein refers generally to a computer program or other module that interacts with a host application to provide a certain, usually very specific, function "on demand". The location information 310 that is provided by the location data tracking module 152 may include accurate position data, head turning information, distance to objective, and optimal path route. The location information 310 may be further employed to synthesize three-dimensional spatial location data 320 such as, for example, sound, distance, and signatures with respect to multiple objects in the vicinity.

The term "acoustic user interface", as utilized herein, refers generally to any representation of an environment to a person utilizing an acoustic signal. The acoustic user interface 350 transmits the three-dimensional spatial data 320 via an auditory channel 330 to the stereophonic device 385. An acoustic signal 340 may be transmitted to the user 380 utilizing the stereophonic device 385. The acoustic user interface 350 may utilize a human stereophonic perception of one or more acoustic signal variables 360 that may be caused by the difference in arrival of the acoustic signal 340 at each ear.

Note that the stereophonic device 385 may include, for example, speakers configured and/or integrated into a helmet 395. The stereophonic device 385 may also be, for example, earphones, a virtual reality device, etc. For example, a person may wear or otherwise carry the stereophonic device 385, such as, for example, earpiece, headphones (with one or two speakers), or other device. Note that as utilized herein, the term "virtual reality" and "virtual reality device" refers generally to a human-computer interface in which a computer or data-processing system such as system 100 creates a sensory-immersing environment that interactively responds to and is controlled by the behavior of the user.

The acoustic signal variables 360 may be, for example, frequency, time delay from a reference time, tone pulse duration, and apparent direction of origin. The variation in frequency represents the distance to an external object, speaker balance to reproduce the direction to the detected object, and volume to indicate the velocity of the object relative to the user 380. The acoustic signal 340 may be provided to the user 380 via the stereophonic device 385, which can be configured to include one or more speakers 390 having a slight delay in the sound in an individual speaker 390 over another with careful control of the volume in order to create the perception that the sound comes from a particular direction.

The acoustic signal variables 360 may comprise tone pulses that are short in duration relative to a particular frame of time over which information may be presented. The acoustic signal variables 360 may comprise longer tones representing one piece of information to the next without interruption, although potentially with modifications to the tone reflecting changes of information from one frame of information presentation to the next. The delay of a tone pulse from a reference sound (such as a click), tone pulse sequence, tone pulse length, or other temporal information may be employed to represent some aspect of an object location. The tone duration may also convey information, and longer tones may convey multiple pieces of information.

The human stereophonic perception of acoustic signal variables 360 such as direction, pitch, and cadence may also be employed to create the impression of sounds arriving from any direction in order to co-ordinate and communicate more effectively location information. For example, each time that a sound effect is called in response to a state change or object movement, the corresponding sound effect may be played at a frequency that may be randomly selected. The spatial information with respect to the acoustic signal variables 360 may be determined either by user preference or an experimentally determined information mapping designed to take advantage of human auditory perceptual capabilities.

The stereophonic device 385 may convert the acoustic signals 340 from the acoustic user interface 350 to stereophonic sound data so that the location of the object may be recognized based on the relative location and state value computed by the acoustic user interface 350. The stereophonic sound data that is converted by the stereophonic device 385 may be closest to the original acoustic signals for true sound quality so that the user 380 may immediately recognize the location of the object. The stereophonic device 385 may be three-dimensional since music or acoustic effects are delivered to the user 380 through the speakers 390 that are placed on the left and right sides and surrounding the user 380.

The head turning behaviors associated with the user 380 may permit the user 380 to focus on the direction of the sound. The direction and heading information may be provided utilizing a combination of map information and/or a compass heading or gyroscope heading that may be mounted into or integrated with the helmet 395 of the user 380. A gyroscope 397 is shown in FIG. 3 as mounted on the helmet 395 but may be integrated within the helmet 395 rather than simply mounted or attached to the helmet 395, depending upon design considerations and goals. The variation in acoustic signal 340 may be employed to identify other important objects in the vicinity such as for example, co-workers or dangerous equipment that the user 380 must be aware of. For example such information may be critical for a fire fighter where a rapid intervention team (RIT) may be sent into a burning building to locate a fire fighter in distress. Note that the hands-free acoustic user interface 350 disclosed herein can also be utilized by, for example, a fire team conducting an operation in a building under conditions in which visibility is obscured. The acoustic user interface 350 can be employed to provide an awareness to each team member with respect to the relative location of every other team member.

The user 380 may be effectively tracked and information regarding the location, status and other operational data may be availed immediately and with a high degree of accuracy. The acoustic user interface 350 in association with the location tracking module 152 may be therefore utilized in broad range of government and military applications with greater security and safety measures. The acoustic user interface system 300 in combination with PAS alert information may provide every team member a vector and distance to a downed colleague. The acoustic user interface system 300 may also be employed as a critical element of a route planning system that plans out the optimal route to a downed fire fighter or for a distressed fire fighter to find his way out.

Also, at each turn in the path, the acoustic user interface system 300 may communicate the optimal direction and path to be followed by the user 380 and the distance to the next waypoint. Note that the acoustic user interface 350 for direction guidance and spatial awareness is not only hands-free, but also places fewer cognitive workload demands on the user 380 than if the same information were delivered in the form of, for example, human speech. In other examples, a person's control of a device may be assisted by receiving auditory information relating to the environment of the remote device, for example the piloting of a remote control plane, positional feedback to a surgeon during surgery, control of a vehicle or other device within a simulated environment (such as a computer game), and the like.

Thus, it can be appreciated that aspects of sounds variables, such as, for example variables 360, can be utilized to encode user/object identification. For example, with this approach one can not only know from the spatialized sound that a team member is over there at 60 degrees bearing and 30 feet away, but also know that it is his or her team member, Joe Johnson, because that tone is always associated with Joe. We can take this one step further and encode not only the ID of each team member, but also their status (i.e., this can interface with their PAS device or other device capable of reporting if they are in trouble, and modulate their ID sound to indicate whether they are safe or not).

Figure 4:
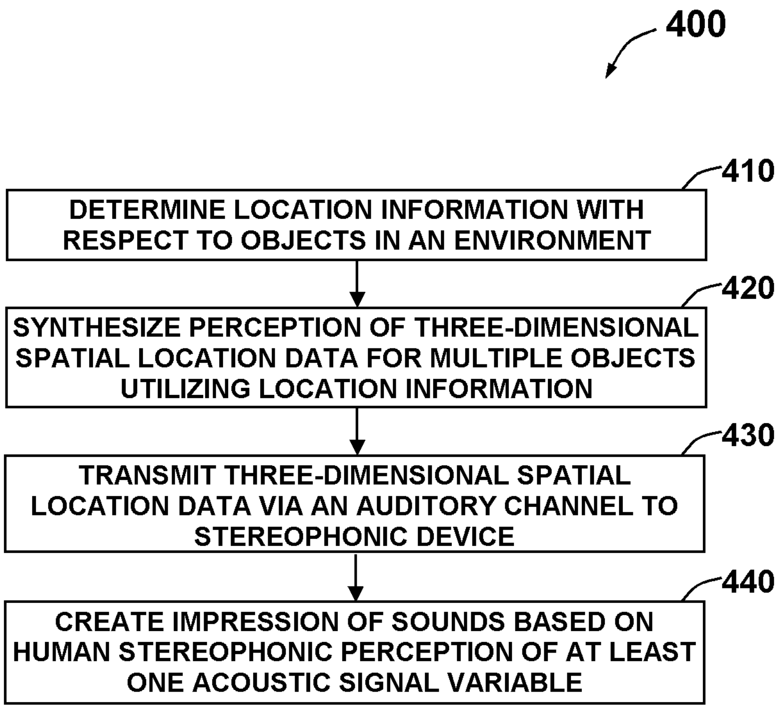
FIG. 4 illustrates a high level flow chart of operation illustrating logical operational steps of a method for tracking spatial location data via an acoustic user interface, in accordance with the disclosed embodiments.

FIG. 4 illustrates a high level flow chart of operations illustrating logical operational steps of a method 400 for tracking spatial location data via the acoustic user interface 350, in accordance with the disclosed embodiments. The location information 310 with respect to an object in an environment may be initially determined utilizing the location tracking module 152, as illustrated at block 410. The perception of three dimensional spatial location data 320 with respect to multiple objects in the vicinity may be synthesized, as depicted at block 420. The three-dimensional spatial location data 320 may include a perception of three-dimensional sound, distance, and signatures with respect to multiple objects in the vicinity.

Thereafter, the three dimensional spatial location data 320 may be transmitted to the stereophonic device 385 via the auditory channel 330, as indicated at block 430. The impression of sounds arriving from any direction may be created based on a human stereophonic perception of the acoustic signal variable (e.g., direction, pitch, and cadence) 360, as depicted at block 440. The acoustic user interface system 300 in association with the location tracking module 152 may be efficiently utilized for mutual communications between the users in a congested area by outputting the stereophonic sound via the stereophonic device 385. The user 380 may effectively acquire the relative location with respect to the objects and immediately perceive the location of the sound coming from a specific direction.

Based on the foregoing, it can be appreciated that varying embodiments for presenting spatial location data are disclosed herein. Some embodiments can be implemented in the context of a method, while other embodiments can be implemented in the context of a system and/or variations thereof. One embodiment of a method generally includes synthesizing a perception of three-dimensional spatial location data with respect to one or more objects (among, for example, a group of objects) in an environment based on location information provided by a location tracking unit. Additionally, such a method includes transmitting the three-dimensional spatial location data as an acoustic signal via an auditory channel to one or more stereophonic devices based on a human stereophonic perception of one or more acoustic signal variables correlated with a relative location of the object (s) in order to effectively coordinate and communicate location information.

In another embodiment of such a method the acoustic signal can be utilized to indicate a particular direction with respect to the object(s) by varying one or more attributes of the sound between stereophonic devices. Note that in accordance with the disclosed embodiments (e.g., method, system, etc.), the acoustic signal can indicate the direction by changing any or all of the attributes of the sound between the speakers, such as, for example, but not limited to time delay, volume, phase difference from high frequency sounds, and so forth.

Additionally, in another embodiment, the acoustic signal can be provided based on an orientation of a head, wherein a perceived relative direction of the object(s) remains constant with respect to a direction of sound when the head is rotated. In still a further embodiment, the acoustic signal can be provided based on tone pulse duration to determine the relative location associated with the object(s) within the environment, and/or on a pre-determined characteristic to determine the relative location associated with the object(s) within the environment. Note that in accordance with the disclosed embodiments (e.g., method, system, etc), different objects can be differentiated with acoustic signals using, for example, but not limited to cadence, pitch and/or other tone characteristics that allow different acoustic signals to be differentiated by the human ear.

Additionally, the stereophonic device (s) may be, for example, one or more speakers associated with a helmet, one or more earphones and/or a virtual reality device.

In another embodiment, the location can be, for example, information indicative of an object distance, an object direction, an object position, an object heading, object identification and/or an optimal path route. Data indicative of the object direction can be provided in correspondence with map information. Additionally, a compass heading can be provided with respect to the stereophonic device(s) for providing data indicative of the object heading. Additionally, a gyroscopic heading can be mounted with respect to the stereophonic device(s) for providing data indicative of the object heading.

It can be additionally appreciated, based on the foregoing, that in another embodiment, a system for presenting spatial location data is disclosed. Such a system includes a processor, a data bus coupled to the processor, and a computer-usable medium embodying computer code. The computer-usable medium can be coupled to the data bus, and the computer program code can include instructions executable by the processor and configured for at least, but not limited to synthesizing a perception of three-dimensional spatial location data with respect to one or more object(s) in an environment based on location information provided by a location tracking unit; and transmitting the three-dimensional spatial location data as an acoustic signal via an auditory channel one or more stereophonic devices based on a human stereophonic perception of one or more acoustic signal variables correlated with a relative location of the object(s) in order to effectively coordinate and communicate location information.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for presenting spatial location data, comprising:

determining spatial information with respect to at least one acoustic signal variable based on at least one of a user preference and information mapping;

synthesizing a perception of three-dimensional spatial location data from said spatial information with respect to at least one object in an environment based on location information provided by a location tracking unit;

configuring said location information to comprise at least one of the following types of information with respect to said at least one object: an object distance; an object direction; an object position; an object heading; an object identification; an object state or an object condition; and an optimal path route;

transmitting said three-dimensional spatial location data as an acoustic modeling signal via an audio channel to at least one stereophonic device based on a human stereophonic perception of said at least one acoustic signal variable correlated with a relative location of said at least one object in order to effectively coordinate and communicate location information;

utilizing said acoustic modeling signal to indicate a particular direction with respect to said at least one object by varying at least one attribute of a sound between said at least one stereophonic device and at least one other stereophonic device; and displaying a compass heading to provide data indicative of said object heading.

2. The method of claim 1 further comprising providing said acoustic modeling signal based on an orientation of a head, wherein a perceived relative direction of said at least one object remains constant with respect to a direction of sound when said head is rotated.

3. The method of claim 1 further comprising providing said acoustic modeling signal based on tone pulse duration to determine said relative location associated with said at least one object within said environment.

4. The method of claim 1 further comprising providing said acoustic modeling signal based on a pre-determined characteristic to determine said relative location associated with said at least one object within said environment.

5. The method of claim 4 further comprising configuring said at least one stereophonic device to comprise at least one of the following types of devices:

at least one speaker associated with a helmet;

at least one earphone; and a virtual reality device.

6. The method of claim 1 further comprising providing data indicative of said object direction in correspondence with map information.

7. The method of claim 1 further comprising displaying a gyroscopic heading to provide data indicative of said object heading.

8. A system for presenting spatial location data, said system comprising:

a processor;

a data bus coupled to said processor; and a computer-usable medium embodying computer code, said computer-usable medium being coupled to said data bus, said computer program code comprising instructions executable by said processor and configured for:

determining spatial information with respect to at least one acoustic signal variable based on at least one of a user preference and information mapping;

synthesizing a perception of three-dimensional spatial location data from said spatial information with respect to at least one object in an environment based on location information provided by a location tracking unit;

modifying said location information to comprise at least one of the following types of information with respect to said at least one object: an object distance: an object direction; an object position; an object heading; an object identification; an object state or an object condition; and an optimal path route;

transmitting said three-dimensional spatial location data as an acoustic modeling signal via an audio channel to at least one stereophonic device based on a human stereophonic perception of at least one acoustic signal variable correlated with a relative location of said at least one object in order to effectively coordinate and communicate location information;

providing said acoustic modeling signal based on an orientation of a lead herein a perceived relative direction of said at least one object remains constant with respect to a direction of sound when said head is rotated;

graphically displaying a compass heading to provide data indicative of said object heading; and graphically displaying a gyroscopic heading to provide data indicative of said object heading.

9. The system of claim 8 wherein said instructions are further configured for utilizing said acoustic modeling signal to indicate a particular direction with respect to said at least one object by varying at least one attribute of a sound between said at least one stereophonic device and at least one other stereophonic device.

10. The system of claim 8 wherein said instructions are further configured for providing said acoustic modeling signal based on tone pulse duration to determine said relative location associated with said at least one object within said environment.

11. The system of claim 8 wherein said instructions are further configured for providing said acoustic modeling signal based on a pre-determined characteristic to determine said relative location associated with said at least one object within said environment.

12. The system of claim 11 wherein said instructions are further configured for modifying said at least one stereophonic device to comprise at least one of the following types of devices:

at least one speaker associated with a helmet;

at least one earphone; and a virtual reality device.

13. The system of claim 8 wherein said instructions are further configured for providing data indicative of said object direction in correspondence with map information.

14. A system for presenting spatial location data, said system comprising:

a processor;

a data bus coupled to said processor; and a computer-usable medium embodying computer program code, said computer-usable medium being coupled to said data bus, said computer program code comprising instructions executable by said processor and configured for;

determining spatial information with respect to at least one acoustic signal variable based on at least one of a user preference and information mapping;

synthesizing a perception of three-dimensional spatial location data from said spatial information with respect to at least one object in an environment based on location information provided by a location tracking unit;

transmitting said three-dimensional spatial location data as an acoustic modeling signal via an audio channel to at least one stereophonic device based on a human stereophonic perception of at least one acoustic signal variable correlated with a relative location of said at least one object in order to effectively coordinate and communicate location information; and utilizing said acoustic modeling signal to indicate a particular direction with respect to said at least one object by varying at least one attribute of a sound between said at least one stereophonic device and at least one other stereophonic device;

graphically displaying a compass heading to provide data indicative of an object heading of said at least one object utilizing said acoustic modeling signal; and graphically displaying a gyroscopic heading to provide data indicative of said object heading of said at least one object utilizing said acoustic modeling signal.

15. The system of claim 14 wherein said instructions are further configured for providing said acoustic modeling signal based on an orientation of a head, wherein a perceived relative direction of said at least one object remains constant with respect to a direction of sound when said head is rotated.

16. The system of claim 14 wherein said instructions are further configured for providing said acoustic modeling signal based on tone pulse duration to determine said relative location associated with said at least one object within said environment.

17. The system of claim 14 wherein said instructions are further configured for providing said acoustic modeling signal based on a pre-determined characteristic to determine said relative location associated with said at least one object within said environment.

18. The system of claim 14 wherein said at least one stereophonic device comprises at least one of the following types of devices:

at least one speaker associated with a helmet;

at least one earphone; and a virtual reality device.

19. The system of claim 14 wherein said instructions are further configured for providing data indicative of object direction in correspondence with map information.

* * * * *